No. 772,698. PATENTED OCT. 18, 1904.
H. DARWIN.
LIGHTING AND HEATING APPLIANCE.
APPLICATION FILED MAY 20, 1904.
NO MODEL. 3 SHEETS—SHEET 1.
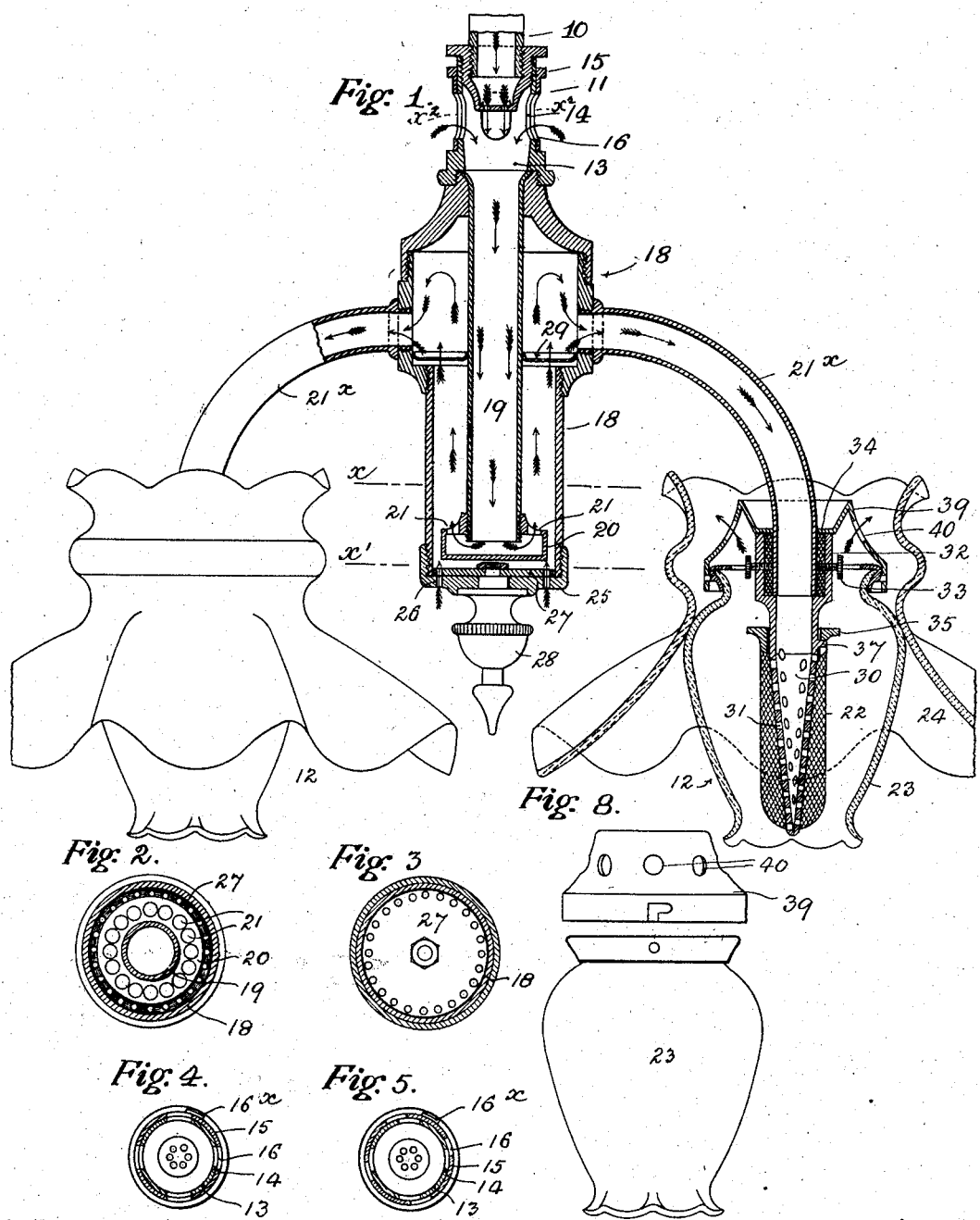
WITNESSES
INVENTOR Harry Darwin No. 772,698. PATENTED OCT. 18, 1904.
H. DARWIN.
LIGHTING AND HEATING APPLIANCE.
APPLICATION FILED MAY 20, 1904.
NO MODEL. 3 SHEETS—SHEET 2.
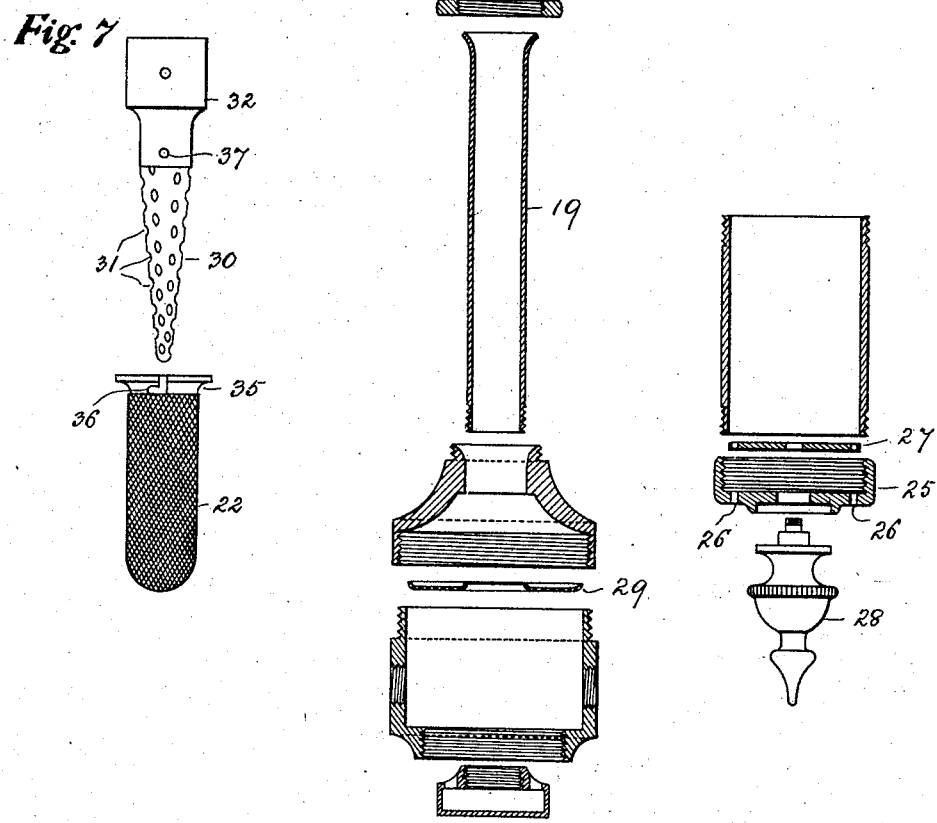
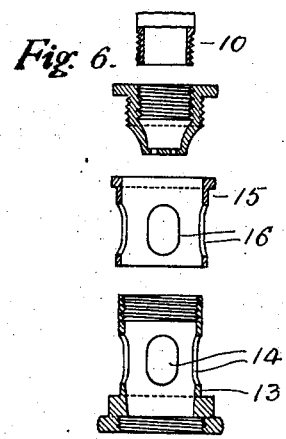
WITNESSES
INVENTOR Harry Darwin

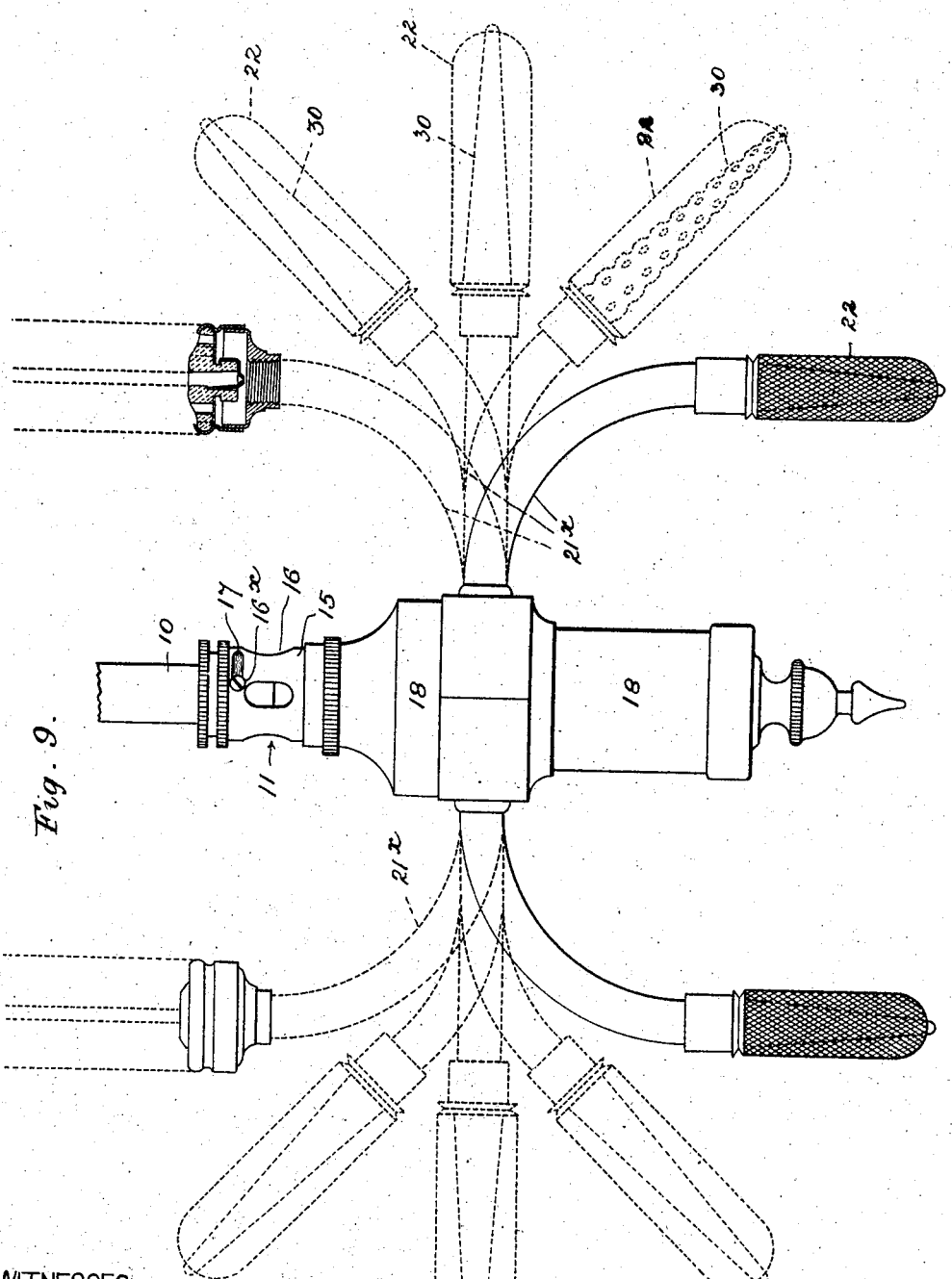

No. 772,698. Patented October 18, 1904.

UNITED STATES PATENT OFFICE.

HARRY DARWIN, OF ERDINGTON, NEAR BIRMINGHAM, ENGLAND, ASSIGNOR TO THE WRIGHT AND BUTLER MANUFACTURING COMPANY, LIMITED, OF BIRMINGHAM, ENGLAND.

LIGHTING AND HEATING APPLIANCE.

SPECIFICATION forming part of Letters Patent No. 772,698, dated October 18, 1904.

Application filed May 20, 1904. Serial No. 208,920. (No model.)

*To all whom it may concern:*

Be it known that I, HARRY DARWIN, gas engineer, a subject of the King of Great Britain, residing at Glenluce Villa, 41 Kingsbury road, Gravelly Hill, Erdington, near Birmingham, England, have invented certain new and useful Improvements in Lighting and Heating Appliances, of which the following is a specification.

This invention has reference to apparatus or appliances for use in connection with various atmospheric burner systems for lighting and heating purposes in which gas, oil-vapor, or other combustible vapor is mixed with atmospheric air before being delivered to the burners.

The said invention is primarily applicable to incandescent-gas and analogous lighting systems; and it consists principally in the first part in providing, in connection with lighting appliances of this class, means for supplying to and thoroughly incorporating or intimately mixing with the ordinary or primary combustible mixture of atmospheric air and gas or vapor an additional or secondary air-supply and incidentally in regeneratively utilizing the heat radiated from the burners of a pendant or the like for raising the temperature of both the primary mixture and the additional air-supply and also the complete mixture, so that the latter is subjected to a preliminary heating before being delivered to the burners, the effect of this preliminary heating and the complete incorporation of the additional air-supply being to greatly increase the temperature developed on combustion of the mixture, so that when the said mixture is burned in contact with an incandescent mantle for lighting purposes an intensified illuminosity is obtained.

The second part of the invention consists in the provision, in connection with the mantles of incandescent lamps, of special distributing-burners or devices for distributing or spreading the combustible mixture evenly over the whole of the mantle and enabling the said mixture to be thoroughly burned in contact with mantles arranged in inverted or any other positions, whether horizontally, vertically, or obliquely.

Figure 1 of the accompanying drawings represents a complete sectional view of a regenerative incandescent gas-pendant having inverted or depending burners or lamps and constructed and arranged in accordance with this invention. Fig. 2 is a horizontal section of the lamp or appliance upon the dotted line $x$, Fig. 1. Fig. 3 is a horizontal section upon the dotted line $x'$; and Figs. 4 and 5 represent two further sectional views, both taken upon the dotted line $x^2$, but respectively showing the parts in two different positions. Fig. 6 represents the several component parts of the body of the lamp or appliance separately and in vertical section. Fig. 7 shows the mantle and the distributing-burner or combined burner and gas-distributing device separately and in elevation. Fig. 8 is a separate view of the means provided for connecting the suspended globe to the arm or branch which carries the combined burner and spreader or distributing-burner and the mantle. Fig. 9 is a modification of the apparatus.

The same reference-numerals indicate corresponding parts in the several figures of the drawings.

In the particular form of the improved gas lamp or pendant which is represented in the said drawings the lower end of the gas-supply pipe 10 terminates in an attachment or fitting 11, which is disposed centrally between a series of hanging or depending burners or lamps 12 and is provided with means for admitting two separate or independent but variable or adjustable quantities of atmospheric air into the said fitting and thoroughly intermixing or incorporating same with the gas supplied thereto and for heating the combustible mixture by the heat radiated from the surrounding lamps prior to the delivery of same to the burners. The upper part of this fitting consists of a small chamber 13, attached to the foot of the pipe 10 and having its walls perforated with a series of holes 14 for admitting the ordinary or primary air-supply into the interior of the said chamber, where it meets and forms an initial mixture with the descending stream of gas. The amount of air so admitted may be varied or regulated, according to circumstances or requirements, by arranging around the outside of the chamber a rotatable and perforated sleeve 15, whose perforations 16 are brought more or less coincident with the air-inlet holes 14, as shown in Fig. 5, by turning the sleeve to a corresponding extent, while suitable provision (such as a fixed stud 16× and a slot 17) may be made for limiting the rotatory movement of the said regulating-sleeve. The means for admitting and regulating the primary air-supply is arranged upon the top of another and larger but independent cylinder or secondary mixing-chamber 18, fitted with a depending tube or passage 19, leading from the said primary chamber to near the bottom of the said secondary one and provided at its lower end with a small flat box 20, which is perforated, preferably on the top side only, with a series of small holes 21, wherethrough the initial mixture is delivered upwardly or projected in jets into the said secondary chamber, whose upper part has directed from it a series of arms or branches 21× for carrying the distributing-burners with mantles 22 and their globes 23 and shades 24. The bottom 25 of the chamber 18 (or other part below the box-foot of the pipe 19) is also formed with a series of inlet-holes 26 for the admission of the secondary and additional air-supply, the amount of which may be regulated by means of a rotatable and perforated plate or disk 27, located above the pierced bottom 25 and operated from the outside of the chamber by means of a turn 28, so that the holes in the plate may be brought more or less coincident with the holes in the chamber-bottom to control the admission of air.

Preferably the upper part of the mixing-chamber, from which the burner-arms proceed, is larger interiorly than the lower part, and the two portions are separated from one another by one or more perforated baffle-plates or wire-gauze diaphragms 29, so that as the initial mixture issues from the perforations in the foot of the tube 19 and passes into the lower portion of the independent secondary mixing-chamber it meets the secondary air-supply, which is drawn in through the bottom inlets 26, and this additional supply is thoroughly incorporated with the said initial mixture by being drawn through the baffle-plates or diaphragms interposed between the upper and lower parts of the secondary mixing-chamber before being allowed to pass from the said upper part to the burner branches.

In addition to the thorough admixture of the primary and secondary air-supplies, as described, perfect combustion, and consequently an intensified illuminosity, is insured by the disposition of the appliance, and particularly the secondary mixing-chamber in a central position between the burners carried by the branching arms, so that the heat radiated from the burners will play upon the said chamber, and consequently the temperature of both the primary mixture, the additional or secondary air-supply, and also of the perfected combustible mixture will be considerably raised before the said mixture reaches the burners. If necessary, simple air-holes only may be provided for the admission of the primary and the additional air-supplies without regulators or means for controlling the quantities of air admitted.

The distributing-burner or combined spreader or distributer and burner 30, which may be used in connection with lamps having mixing attachments such as above described, (but is also applicable to other incandescent lighting or illuminating systems,) consists, essentially, of a conoidal truncated cylindrical or similar attachment made of steatite, porcelain, or like highly-refractory or heat-resisting material and pierced with holes or reticulations 31. This distributer is attached to the gas-supply branch or arm and is inserted axially within the inside of a mantle 22, which is secured thereto in such a manner that a space or clearance is left between the outside of the perforated distributer and the inside of the mantle. If necessary, the point or apex of the distributer may be passed through a hole or perforation in the crown of the mantle, whereby the latter is centralized and held steadily or secured to the internal spreader at both ends.

By the employment of a distributer and burner such as described the mantle may be held in any position, whether horizontally or in vertically or obliquely depending or inverted positions, as well as in the usual upright position, and the perforations in the device insure the even distribution of the flame over the whole of the mantle, as the said perforations cause the mixture to issue from the spreader in a series of jets or streams which play or impinge upon the inside of the mantle at all points and when ignited result in a brilliant incandescent-lighting effect being obtained, as the whole surface of the mantle is efficiently or effectually utilized for intensifying the illuminosity of the flame.

The distributing-burner attachment represented in the drawings is of conoidal form, and it is secured to the extremity of the arm or branch of the pendant by an integral sleeve or nozzle 32, adapted to socket onto the end of the said branch and be there affixed by set-screws 33, which may be passed through a sleeve 34, of asbestos or the like, interposed between the socket and the branch. The connection of the mantle may be provided for by tying or otherwise securing its mouth end to a steatite, porcelain, or like ring 35, having bayonet-slots 36, adapted to be engaged with studs 37 on the sides of the sleeve of the distributer; but any other method of connection may be employed.

The lamps are provided with globes 23, which may be suspended from and detachably secured by bayonet-joint or other connections to sheet-metal caps 39, resting upon the tops of the distributer-sleeves, as shown in Fig. 1, and these caps may have perforations 40 in the sloping sides to admit of the escape of the rising products of combustion. A shade 24 may also be used and is supported by the globe, as shown.

Fig. 9 is a view showing various dispositions of burner arms or branches (including depending or inverted, inclined, and horizontal forms) with which incandescent mantles can be effectively used when provided with distributing burners and supports such as hereinbefore described. This view also shows a pair of arms for carrying mantles in upright or vertical positions, in which case the distributing devices are not necessary. It is obvious that the mixing appliance shown in Figs. 1 and 9 can also be used in the reverse position to that in which it is there represented—that is to say, with the secondary mixing-chamber superimposed or arranged above the means provided for the formation of the primary or ordinary mixture.

Having fully described my invention, what I desire to claim and secure by Letters Patent is—

1. An apparatus of the class described, having a plurality of communicating mixing-chambers provided with openings leading to the atmosphere, means for regulating the openings, a series of distributing-tubes in communication with one of the said chambers, and burners carried by the distributing-tubes in close proximity to the said chambers to promote combustion.

2. An apparatus of the class described comprising a primary mixing-chamber, a secondary mixing-chamber in communication with the primary chamber, said chambers provided with openings to the atmosphere, means for regulating the opening, a series of distributing-brackets depending from said secondary chamber, and burners supported by said brackets and in close proximity to the secondary chamber for promoting combustion.

3. In an incandescent gas-burner, the combination of a plurality of air and gas communicating mixing-chambers, means for regulating the supply of air thereto, a series of distributing-brackets depending from one of the said chambers and having burners in close proximity to the chambers to promote combustion, and mantles carried by the burners.

4. In an apparatus of the class described, the combination of a plurality of air and gas mixing chambers arranged one within the other, said inner chamber provided with a deflector-box having communication with the outer chamber, a series of distributing-brackets having burners depending from the outer chamber, said outer chamber being intermediate the brackets and in close proximity to the burners to promote combustion, and means for regulating the supply of air to the chambers.

5. In an incandescent gas-burner, the combination of a plurality of distributing-brackets having burners, a mixing-chamber, a supply-tube having a mixing-chamber extending into the first-mentioned chamber and terminating in a deflector-box having openings for directing the course of the mixture therefrom, means for regulating the supply of air to the chambers and said burners arranged in close proximity to the mixing-chambers to promote combustion.

In testimony whereof I have hereunto set my hand in presence of two subscribing witnesses.

HARRY DARWIN.

Witnesses:
 Hy. Skerrett,
 Arthur Sadler.